United States Patent [19]

Lough

[11] Patent Number: 4,490,486

[45] Date of Patent: Dec. 25, 1984

[54] FORMALDEHYDE IMMOBILIZATION METHOD

[76] Inventor: Merlin E. Lough, Fox Island, Wash. 98333

[21] Appl. No.: 417,132

[22] Filed: Sep. 13, 1982

[51] Int. Cl.$^3$ .............................. C08J 9/36; C08J 9/40
[52] U.S. Cl. ....................................... 521/53; 52/743; 521/187; 521/188
[58] Field of Search ..................... 521/53, 188; 52/743

[56] References Cited

U.S. PATENT DOCUMENTS

| | | | |
|---|---|---|---|
| 3,189,479 | 6/1965 | Coppick et al. | 521/187 |
| 3,284,379 | 11/1966 | Brasco et al. | 521/53 |
| 3,290,260 | 12/1966 | Buccigross | 521/53 |
| 3,312,639 | 4/1967 | Justice | 521/188 |
| 3,855,161 | 12/1974 | Bauer | 521/53 |
| 4,119,757 | 10/1978 | Hobson et al. | 521/188 |

*Primary Examiner*—Morton Foelak
*Attorney, Agent, or Firm*—David L. Garrison

[57] ABSTRACT

Residual formaldehyde contained in urea formaldehyde structures is immobilized by subjecting the structure to a gaseous mixture of a carrier/penetrating gas and a reactive gas chosen from the group consisting of anhydrous ammonia, ozone and mixtures thereof for a period sufficient to react with and immobilize the formaldehyde. In building construction utilizing urea formaldehyde foamed in place insulation the method comprises the steps of injecting the gaseous mixture of the carrier/penetrating gas with anhydrous ammonia, ozone or a mixture of anhydrous ammonia and ozone into the stud space containing the foamed in place urea formaldehyde insulation. For structures in which particle board or similar manufactured sheet material contains residual formaldehyde the formaldehyde may be reacted by exposure of the surface of the panel to anhydrous ammonia, ozone or mixtures thereof contained in the carrier/penetrating gas.

3 Claims, No Drawings

FORMALDEHYDE IMMOBILIZATION METHOD

BACKGROUND OF THE INVENTION

This invention relates to methods of immobilizing formaldehyde contained in foamed urea formaldehyde insulation or in composite panel structures built up with a cellulosic material bound together by formaldehyde containing binders.

This invention further relates to a method of in situ treatment of structures containing foamed-in-place urea formaldehyde insulation to immobilize and react the residual formaldehyde contained in the insulation structure, thereby preventing the gradual release to the atmosphere of formaldehyde.

The construction industry has recently become acutely aware of the potential health hazzards due to free formaldehyde being present in the ambient air of homes and other structures using products that contain urea formaldehyde resin material or formaldehyde containing binder resins. A need exists to counteract the presence of free formaldehyde, in both newly manufactured construction materials and in those materials already installed in homes and other structures, including primarily the foamed-in-place urea formaldehyde insulation. Much effort has been expended by manufacturers and builders toward developing reductions in formaldehyde levels in existing housing units as an interim solution to the formaldehyde problem in existing dwellings.

It is well known that ammonia, as an active chemical ingredient has a natural chemical affinity for reacting with formaldehyde to form a compound called hexamethylene tetramine. This is a stable white chrystalline organic material formed as a product of a reaction of the two gases in such a way as to immobilize formaldehyde. A prior development known to this inventor was the treatment of a mobile home using ammonia vapor that had been evaporated from a concentrated ammonium hydroxide solution placed in buckets on the floor of the various rooms of the mobile home. The mobile home was closed up in an effort to keep the ammonia vapors inside and the system allowed to generate those vapors of ammonia for a period of approximately 24 hours, in an attempt to neutralize the formaldehyde vapors in that home. The result of that first test, and a substantial number of mobile homes treated subsequently had indicated that this ammonia evaporation technique would substantially reduce the residual formaldehyde vapor levels. In the case of this specific mobile home unit treated as described above that unit has since been monitored on a quarterly basis and has been found to have a permanently reduced level of formaldehyde vapors within the home.

Ammonia gas vapors, being rather large molecules, suffer from a difficulty in penetrating and flowing through tortuous pathways such as is frequently found in the wall construction of dwellings. As a result, the interior exposure only of the walls in a mobile home or residence to ammonia vapors alone fails to reach all areas of the wall structure containing free formaldehyde. The prior art process was primarily directed to treating wood product paneling and fabrics bonded together with urea formaldehyde resins, and is ineffective in treatment of urea formaldehyde foamed in place insulation in many dwellings.

In considering methods of treating stud wall structures with anhydrous ammonia as the active ingredient, a number of potential barriers to accomplishing this were encountered: (1) Current code requirements for fire blocking and/or cross bracing within the stud cavities of walls could potentially provide a barrier for injecting of an active neutralizing gas such as anhydrous ammonia. (2) It also became important to consider whether the individual bubbles that made up the urea formaldehyde foam were of a closed cell or an partially open cell structure to allow for the entry of the active neutralizing gas into the foam system.

Steps taken by others in the past to reduce formaldehyde emission from urea formaldehyde resins and foams include the incorporation of an aromatic substance into the prepolymer which reacts with the free formaldehyde after polymerization, for example as is shown in U.S. Pat. No. 4,273,883 issued June 16, 1981 to Korf. Starch and excess urea have similarly been used as shown in U.S. Pat. No 4,119,757 issued Oct. 10, 1978 to Hobson, U.S. Pat. No. 3,996,190 issued Dec. 7, 1976 to O'Neill, and U.S. Pat. No. 3,231,525 issued Jan. 25, 1966 to Kelly, et al. Ammonium bicarbonate and carbonate, with a terpene also is taught as constituents to be added before polymerization of the foam to decrease formaldehyde emissions in U.S. Pat. No. 3,312,639 issued Apr. 4, 1967 to Justice.

All of the foregoing treatment schemes must be carried out during processing of the ingredients of the polymerization system. No teaching shows post treatment other than the crude exposure, room by room, to ammonia fumes as described above.

OBJECTS OF THE INVENTION

It is an object of this invention to provide a method of immobilizing residual formaldehyde contained in structural urea formaldehyde foams and in other building materials which utilize binders containing residual formaldehyde.

It is another object of this invention to provide a method of treating in situ structures such as buildings in which urea formaldehyde foam has been injected into stud spaces for the purpose of insulating the structure in order to immobilize any free formaldehyde remaining in the foam structure.

DISCLOSURE OF THE INVENTION

Formaldehyde is immobilized or reacted in situ within urea formaldehyde containing foams or panels by subjecting the foam or panels to a reactive gas mixture in a closed space, the reactive gas mixture consisting of ammonia, ozone, and mixtures thereof as the active ingredient, with a carrier/penetrating gas chosen from the group consisting of hydrogen, helium, the inert gases and mixtures thereof.

Pretreatment of the foam or panel structure with ozone enhances the reaction of the formaldehyde to a non volatile substance which remains in the foam or panel.

BEST MEANS FOR CARRYING OUT THE INVENTION

These and other objects of the invention, which will become more apparent from a detailed reading of the following specification, can be attained by subjecting the formaldehyde containing foam or other material to anhydrous ammonia mixed with a penetrating type carrier gas chosen from the group consisting of hydrogen, helium, and the noble gases. Preferably the penetrating gas is hydrogen or helium and for most situations, the non-flammable characteristics of helium make it the logical choice for the prefered substance. The penetrating/carrier gas enables the anhydrous ammonia or other reactive gas to migrate to the location of the formaldehyde within the urea formaldehyde foam structure and react with the formaldehyde to form an immobile substance such as, for example, hexamethylenetetramine or other intermediate materials normally found in the well known reaction of ammonia with formaldehyde. While the composition does not appear to be critical, from minute quantities up to 90% by volume of the penetrating/carrier gas may be used. If the treatment is to be done in locations in which the ammonia gas alone can reach the remote areas, a reactive gas containing only anhydrous ammonia may be used, so long as it is confined within the stud space to give full exposure of the foam to the reactive gas constituent.

In the application in which homes have been insulated either during or after construction with urea formaldehyde foam within the stud spaces, the prior solution to eliminating the health hazard of free formaldehyde present in the foam has been to remove the wall board, tear out the insulation and replace the wall board and insulation with materials which do not exhibit the health hazard of free formaldehyde. The invention taught herein contemplates injection of anhydrous ammonia carried by a penetrating/carrier gas such as hydrogen or helium or mixtures thereof into the wall stud space. Small holes are drilled at the top and bottom of the stud space and a sensor is placed to sample gas removed from the top holes. When ammonia is detected, indicating that air within the stud has been replaced by the ammonia-carrier gas mixture, the holes at the top and the bottom are closed. After a substantial period of time i.e. up to 24 hours or perhaps more has passed the ammonia will have completed its penetration into the foam and reacted with any free formaldehyde present. Some of the ammonia may be adsorbed within the foam and remain to attack bound formaldehyde not otherwise immobilized with the ammonia initially. Upon completion of the treatment period the remaining gases are exhausted from the stud cavity to avoid the presence of substantial amounts of free ammonia remaining in the stud space. The wall board is then repaired and painted.

Analysis of the foam shows that the ammonia treatment raised the pH from about 2-3.5 up to the range of 6.5-7.

An alternate treatment approach is especially useful in situations in which wall board is utilized in a building construction in which free formaldehyde remains from the binder used to form the wall board. An example would be mobile home construction. A pressurized source of anhydrous ammonia together with its penetrating carrier gas such as hydrogen or helium is placed within a room such as a room in a mobile home unit for treatment. The room is sealed and the supply of anhydrous ammonia and carrier/penetrating gas is released within the room in an adequate quantity to force much of the room air out and provide a high concentration of ammonia and the penetrating/carrier gas in the room. The ammonia and its carrier gas enter the wall boards and other building materials in the room and attack the free formaldehyde remaining in the wall boards to immobilize the formaldehyde in the form of hexamethylenetetramine or other reaction products of ammonia and formaldehyde.

The reaction between formaldehyde and the ammonia carried by the penetrating/carrier gas as taught in the method of this invention may be enhanced by either pretreatment or concurrent treatment of the urea formaldehyde foam or particle board with ozone. In one preferred embodiment of this invention a stud space of a wall insulated with urea formaldehyde foam is subjected to a pretreatment with ozone prepared in well known manner by an ozone generator. The ozone is conducted into the interior of the stud space and may be mixed with other reactive gases or preferably with a penetrating/carrier gas such as hydrogen, helium or one of the noble gases. As a result of the pretreatment or concurrent treatment of the formaldehyde containing insulation foam it is apparent that a further reduction of the free formaldehyde remaining is obtained. For example in testing procedures in which ammonia gas in a helium carrier was used without pretreatment approximately 80% of the formaldehyde present in the urea formaldehyde foam was immobilized into the form of hexamethylenetetramine or other products of the reaction between ammonia and formaldehyde. Treatment of the urea formaldehyde foam with ozone alone appears generally to eliminate approximately 20 to 25% of the free formaldehyde present. By conducting a pretreatment step using ozone as the reactive gas over all reduction of the free formaldehyde substantially exceeds the 80% reduction obtained with ammonia alone. It is theorized by the inventor that the additional immobilization of free formaldehyde may occur due to hydrolization of the foam or other interraction of the foam with the ozone rendering it more readily penetrated by the subsequently applied ammonia gas in its carrier/penetrating gas.

In developing the initial treatment test plan measured amounts of urea formaldehyde foam were treated in well known analytical procedures to determine the amount of formaldehyde present. A sample of foam of known weight was allowed to stand in a sealed container with a petri dish filled with distilled or deionized water for a period of two hours during which time formaldehyde emitted from the foam was absorbed into the water. The water was then analyzed by the Chromotropic acid method as defined by the National Institute for Occupational Safety and Health (NIOSH) method for testing free formaldehyde emissions. This baseline information was then used to determine the formaldehyde immobilization using pure anhydrous ammonia and mixtures of anhydrous ammonia with various carrier gases. The treatments were conducted for periods of 4 to 24 hours of treatment time with pure ammonia, with ammonia and mixtures of ammonia and helium ranging up to about 90% helium and the balance being ammonia. As a result of these tests it was determined that the helium itself did not provide any active role in the neutralizing of the formaldehyde in the foam but did provide, where ever there were restrictions to gaseous ammonia flow, an acceleration of gas movement which would be analagous to flow about structural blockages that might be found in stud cavities and the like. Where the ammonia had free and open access to the foam it was found that there was no significant difference in the treatment time or the treatment effectiveness using helium gas as a carrier however where ever there were restrictions to gaseous flow an improved neutralization rate was observed. The initial testing resulted in the determination that the composite average in the reduction of formaldehyde release after treatment averages in the order of approximately 80% and most importantly the formaldehyde continues to stay at that approximate 80% reduced level after the treatment has been accomplished.

Because the chemical reactions involving formaldehyde are considered very complex and not fully understood it is also possible that the available free formaldehyde being released by the foam is being fully neutralized by the ammonia as an active ingredient but that paraformaldehyde or other forms of the basic formaldehyde compound which do not react with ammonia to form hexamethylenetetramine resultant compound make up the approximately 20% residual showing up as formaldehyde in the testing procedure. Pretreatment of the foam with ozone did result in a significant overall reduction of the free formaldehyde as tested after completion of the treatment with ammonia.

The foregoing description of the process is exemplified by the following examples of use of the process in the immobilization of free formaldehyde in urea formaldehyde foam insulated structures.

EXAMPLE 1

A home in which urea formaldehyde foam was installed in the stud cavities in the outer wall was used as a test structure. The air inside the rooms and the air contained in the exterior wall stud cavities were sampled in manner specified in the NIOSH Chromotropic acid technique. The ambient room air contained approximately 0.4 ppm formaldehyde. The air within the stud space contained approximately 1.0 ppm formaldehyde. Samples of the foam insulation were removed from the exterior walls of the home to evaluate the nature or the foam insulation. The samples were physically and microscopically examined to verify that their cell structure and physical condition was of a nature to be treatable in this process and that the material was suitable as an insulating material. Specifically the examination was done visually to compare the samples with known samples of urea formaldehyde foam to ensure that the sample being examined was in fact the treatable foam substance.

Each stud cavity in the exterior wall of the home was perforated at the top and the bottom. A mixture of approximately 10% helium and 90% anhydrous ammonia was injected into the stud cavity at the bottom and permitted to flow upwardly through the stud cavity until it was diffused throughout the cavity and detectable at the perforation at the top of the stud cavity. The determination that the gas was exiting at the upper perforation of the stud cavity was made by noting the pH color change with a piece of wet pH paper resulting from the presence of active ammonia. Once a steady flow of the active ammonia ingredient was obtained, both the lower and the upper perforations in the stud cavity were securely sealed and the gas permitted to remain in the stud cavity in contact with the urea formaldehyde foam for a period of 24 hours. At the end of that time period the seals at the upper and lower perforations in the stud cavities were removed and the remaining ammonia containing gases vented from the stud cavity. A permanent venting device was installed to vent any remaining gases to the outside of the home and the entire home was ventilated for a period of 24 hours. The home was then retested according to the NIOSH method and the following formaldehyde levels were determined:

|  | 24 hours | 7 days |
| --- | --- | --- |
| ambient room air | less than 0.1 ppm | less than 0.1 ppm |
| stud space air | less than 0.2 ppm | less than 0.2 ppm |

The foregoing test results indicate an approximately 80% reduction in emissions of free formaldehyde.

EXAMPLE 2

Urea formaldehyde foam substantially identical to that treated in Example 1 above was pretreated with a flow of ozone generated from an ozone generator for a period of approximately 30 minutes before the step of treatment with ammonia containing gases. After the ammonia treatment an additional approximately 10% reduction in the emission level of formaldehyde was observed.

INDUSTRIAL APPLICABILITY

The foregoing method of treatment of urea formaldehyde foams and other structural free formaldehyde containing panels and the like may advantageously be treated to reduce or substantially eliminate the presence of the free formaldehyde thus relieving the potential health hazard provided by the presence of excessive amounts of free formaldehyde. In many residences throughout the United States and elsewhere, urea formaldehyde foam was injected into the stud cavities for the residences after construction in an attempt to fully insulate the structures and thereby reduce heat losses during winter months. Similarly urea formaldehyde foam was utilized in some mobile homes manufactured during the past ten to twenty years and the presence of that foam together with paneling materials in which formaldehyde containing binders or resins were used similarly pose a potential health hazard. Treatment of such structures with the method of this invention will largely eliminate the presence of free formaldehyde and reduce the potential health hazard.

In compliance with the statute the invention has been described in language more or less specific as to structural features and reagents. It is to be understood however that the invention is not limited to the specific features and constituents shown since the means herein disclosed comprise but a preferred form of putting the invention into effect. The invention is therefore claimed in any of its forms or modifications within the legitimate and valid scope of the appended claims appropriately interpreted in accordance with the doctrine of equivalents.

What I claim is:

1. A method of immobilizing formaldehyde in formaldehyde containing structures comprising the steps of:
preparing a gaseous mixture consisting essentially of from 1.0 to 90% penetrating/carrier gas chosen from the group consisting of helium, hydrogen, neon, argon and mixtures thereof, and from 99 to 10% ammonia by volume;
subjecting the formaldehyde containing structure to said gaseous mixture in a closed space for a time to react and immobilize said formaldehyde; and venting and exhausting the ammonia containing gaseous mixture from said closed space, whereby the level of free formaldehyde contained in said formaldehyde containing structure is reduced.

2. The method of claim 1 wherein said gaseous mixture further contains ozone.

3. The method of claim 1 and the step of pretreating said formaldehyde containing structure with ozone.

* * * * *